Patented Nov. 16, 1948

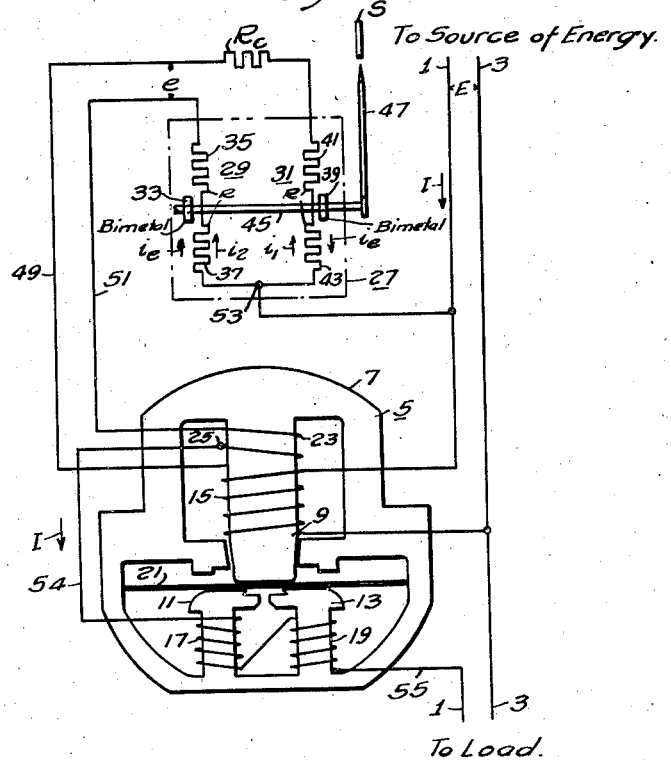

2,454,201

UNITED STATES PATENT OFFICE 2,454,201

ELECTRICAL MEASURING INSTRUMENT

Ambrose J. Petzinger, Passaic, and Rodney V. Adams, East Orange, N. J., assignors to Westinghouse Electric Corporation, East Pittsburgh, Pa., a corporation of Pennsylvania Application November 13, 1943, Serial No. 510,132

11 Claims. (Cl. 171—95)

This invention relates to electrical instruments and it has particular relation to electrical measuring instruments of the thermoresponsive type suitable for measuring a function of the product of the voltage and current in an electrical circuit.

A commonly encountered form of thermoresponsive instrument comprises a pair of thermoresponsive units which are connected in series across the secondary winding of a transformer for energization in accordance with the voltage of an associated electrical circuit. In addition, the thermoresponsive units are connected in parallel for energization in accordance with the current flowing in the associated electrical circuit. A pointer differentially actuated by the thermoresponsive units indicates on a suitable scale the demand in watts of the associated electrical circuit. An instrument of this type which normally is available on the market is described in the Vassar Patent 2,323,738 granted July 6, 1943.

The accuracy of an instrument of the foregoing type is dependent in part on the performance of the transformer. Accurate performance presupposes an ideal transformer wherein the secondary output voltage is in phase with or in phase opposition to the primary input voltage depending on the connections employed. Because of the core and resistance losses in a transformer and because of the leakage reactance of the windings, such ideal performance cannot be obtained in practice. The error in phase displacement between primary and secondary voltages of the transformer results in an error in the performance of the associated thermoresponsive instrument which is appreciable for low power factors of the electrical circuit from which the instrument is energized. For example, at a 50% power factor the error in the reading of the instrument may be in excess of 25%.

If the circuit across the secondary winding of the transformer has substantial reactance, the resulting phase displacement between the output voltage of the transformer and the current flowing through the circuit may be a source of error.

A further error may be introduced in the performance of a thermoresponsive instrument which is due to temperature variations. For example, the transformer employed for energizing the instrument generally has copper windings which have a substantial positive temperature coefficient of resistance. Furthermore, the transformer core has a negative temperature coefficient of permeability. Consequently if the instrument is calibrated for operation at one temperature, a change in temperature may introduce an error in the reading of the instrument.

In accordance with the invention, the arms of the parallel circuit employed in part for energizing the thermoresponsive units are provided with different impedances, these impedances may be proportioned to compensate to a substantial extent for the aforesaid phase displacement errors. In addition, the arms may have different temperature coefficients of impedance. When so constructed, the coefficients may be proportioned to compensate to a substantial extent for the aforesaid errors resulting from temperature variations.

It is therefore an object of the invention to provide an improved thermoresponsive instrument.

It is also an object of the invention to compensate an alternating current thermoresponsive instrument for errors introduced by phase displacements between voltages applied thereto and currents flowing therein.

It is a further object of the invention to provide a thermoresponsive-wattmeter which is energized in part from a transformer and which is compensated for errors introduced by the transformer.

It is an additional object of the invention to provide a thermoresponsive instrument having a pair of thermoresponsive units connected across the secondary winding of a transformer and arranged in the arms of a parallel circuit which arms have different impedances.

It is a still further object of the invention to provide a thermoresponsive instrument wherein temperature errors resulting from operation thereof are substantially compensated.

Other objects of the invention will be apparent from the following description taken in conjunction with the accompanying drawing wherein:

Figure 1 is a schematic view of an electrical system which includes a thermoresponsive instrument embodying the invention;

Fig. 2 is a vector representation of current and voltage conditions in the thermoresponsive instrument of Fig. 1; and Fig. 3 is a detail view in front elevation showing a pointer and scale assembly suitable for the instrument of Fig. 1.

Referring to the drawing, Fig. 1 shows an electrical circuit having conductors 1 and 3 for supplying electrical energy from a source of energy to a load. For the purpose of discussion, it is assumed that this electrical circuit is a single-phase circuit designed for operation at a frequency of 60 cycles per second. For measuring electrical energy flowing in the circuit, a watt-hour meter 5 is associated therewith. This watt-hour meter includes a magnetic core 7 having a voltage pole 9 and current poles 11 and 13. A voltage winding 15 surrounds the voltage pole 9 for the purpose of producing when energized a voltage magnetic flux therein. In addition, current winding 17 and 19 surround the current poles 11 and 13 for the purpose when energized of producing current magnetic flux therein. As well understood in the art, energization of the voltage and current windings produces a shifting magnetic field in the gap between the voltage pole and current poles for the purpose of rotating an electroconductive armature 21 which is mounted for rotation in the air gap. A damping magnet (not shown) is associated with the armature 21 for the purpose of damping rotation thereof. The construction and operation of similar watt-hour meters are well understood in the art.

The voltage winding 15 not only serves to produce voltage magnetic flux in the air gap of the watt-hour meter but it serves additionally as the primary winding of a transformer having a secondary winding 23. This secondary winding has a center tap 25. The secondary winding 23 is employed for energizing in part a thermoresponsive instrument 27.

The thermoresponsive instrument 27 includes a pair of thermoresponsive units 29 and 31 which may vary appreciably in construction. For the purpose of discussion, it is assumed that the unit 29 includes a thermoresponsive element in the form of a bimetallic spring 33 and a pair of heating resistors 35 and 37 therefor. The thermoresponsive unit 31 includes a thermoresponsive element in the form of a bimetallic spring 39 and a pair of heating resistors 41 and 43 associated therewith. The bimetallic springs 33 and 39 are differentially associated with a shaft 45 which is mounted for rotation with respect to the remainder of the instrument. The shaft 45 carries a pointer 47 for indicating on a suitable scale S (Fig. 3) the position of the shaft 45.

By means of the conductors 49 and 51, the thermoresponsive units 29 and 31 have their heating resistors connected in a series-circuit across the secondary winding 23. This series-circuit includes a terminal 53 which is positioned between the heating resistors 37 and 43. Consequently, the thermoresponsive units have their heating resistors connected in a parallel circuit between the terminal 53 and the center tap 25. Current I flowing through the conductor 1 may be traced from the conductor to the terminal 53. At the terminal 53 the current I divides into two components $i_1$ and $i_2$, which flow respectively, through the heating resistors of the thermoresponsive units 31 and 29 and through the conductors 49 and 51. The current components $i_1$ and $i_2$ reunite at the center tap 25 to form the current I which flows through a conductor 54, the current windings 17 and 19, and a conductor 55 to the conductor 1.

The voltage winding 15 is connected across the conductors 1 and 3 for energization in accordance with the voltage thereacross. By transformer action the voltage winding 15 induces a voltage in the secondary winding 23. This induced voltage results in a flow of current $i_e$ in series through the heating resistors of the thermoresponsive units 31 and 29. The instantaneous directions of current flow are illustrated by arrows in Fig. 1. The portion of the system illustrated in Fig. 1 which thus far has been specifically described is similar to that shown in the aforesaid Vassar patent, to which references may be made for a fuller discussion thereof. It has been customary to construct the two arms of the parallel circuit between the terminal 53 and the center tap 25 with equal impedances.

In order to understand the invention clearly, it is advisable to consider the performance of the system of Fig. 1 under the assumption that the transformer represented by the windings 15 and 23 is an ideal transformer operating without loss. This ideal transformer is connected to apply a voltage $e$ between the conductors 49 and 51 which is in phase with the line voltage E. Assuming also that the heating resistors offer substantially pure resistance to the flow of current therethrough, the voltage $e$ and the current $i_e$ produced thereby are in phase with each other. As a specific example of ideal phase relations, when the electrical circuit represented by the conductors 1 and 3 is operating at 100% power factor, the line voltage E and the line current I are in phase, the voltage $e$ and the current $i_e$ are in phase; the current $i_e$ is in phase with the current component $i_2$; and the current $i_e$ is in phase opposition relative to the current component $i_1$. Under these circumstances, the pointer 47 is actuated in accordance with the power P flowing in the associated electrical circuit as represented by the well known expression:

$$P = EI \cos \theta$$

wherein $\cos \theta$ is the power factor of the circuit.

In practice it is difficult to maintain a correct relationship between the current $i_e$ and the line voltage E. This may be explained by reference to Fig. 2, wherein the line voltage E is employed as a reference vector. The line current I is displaced from the line voltage by an angle $\theta$. It is well understood that the power factor of the electrical circuit is represented by the term "cosine $\theta$" or "cos $\theta$." In Fig. 2, the line current is illustrated as lagging the line voltage. The line current I is equal to the sum of the current components $i_1$ and $i_2$ which are shown in Fig. 2.

Because of its losses, the transformer formed by the windings 15 and 23 does not apply a voltage $e$ across the conductors 49 and 51 which is exactly in phase with the line voltage E. As shown in Fig. 2, the voltage $e$ may lead the line voltage by an angle $\phi$. This means that the voltage $e$ leads the line current I by an angle $\alpha = \theta + \phi$, and the power $p$ which actuates the instrument 27 is represented by the expression:

$$p = eI \cos \alpha = eI \cos (\theta + \phi)$$

Consequently the pointer 47 does not portray correctly the power P flowing in the associated electrical circuit which is represented by the expression:

$$P = EI \cos \theta$$

The inaccurate operation of the instrument may be understood more clearly by reference to Fig. 3 wherein the pointer 47 is shown associated with the scale plate S which has a linear scale A indicating 10 kilowatts for a full scale deflection of the pointer 47. Let it be assumed that 10 kilovolt-amperes are flowing in the electrical circuit. The errors in the real power measured by the instrument 27 at power factors of 100%, 50% lagging, 80% lagging, and 20% lagging will be considered for an angle $\phi = 4°$.

At 100% power factor ($\theta = 0$) the error introduced by the angle $\phi$ is extremely small ($\cos 4° = 0.998$) and the pointer 47 indicates substantially correctly the kilowatts of the associated electrical circuit.

A 50% lagging power factor ($\theta = 60°$) the instrument should read 5 kilowatts. However, $\cos(\theta + \phi) = \cos(60° + 4°) = 0.438$, and the instrument reads only 4.38 kilowatts on scale A.

The errors introduced by the angle $\phi = 4°$ at various power factors for 10 kilovolt-amperes in the associated electrical circuit may be tabulated as follows:

| Power Factor | Correct Real Power | Power on Scale A | Error |
|---|---|---|---|
|  | Kw. | Kw. |  |
| 100% | 10 | ¹10 | 0 kw. = 0% |
| 80% lagging | 8 | 7.56 | 0.44 kw. = 5% |
| 50% lagging | 5 | 4.38 | 0.62 kw. = 12% |
| 20% lagging | 2 | 1.31 | 0.69 kw. = 34% |

¹ Approximate.

From an inspection of these examples, it is clear that the angle $\phi$ of Fig. 2 introduces an error in the instrument 27 which increases appreciably as the angle of lag $\theta$ increases.

The performance of the instrument 27 can be improved appreciably by suitably unbalancing the impedances of the parallel arms between the terminal 53 and the center tap 25 (Fig. 1). The unbalancing may be effected by employing conductors 49, 51 which differ in impedance, or by inserting a separate impedance in one of the arms. For the purpose of discussion, it is assumed that the difference in impedance of the two arms is represented by a resistor $R_c$ which is connected between the conductor 49 and the resistor 41. Let it be assumed that the total resistance of the resistors 35 and 37 is represented by the value R which also represents the total value of the resistance of the resistors 41 and 43. If the resistances of the winding 23 and of the conductor 49 and 51 are neglected, it can be shown that the rotation of the pointer 47 is proportional to the expression $$\frac{2R}{2R+R_c}\left(e^I \cos \alpha + \frac{I^2 R_c}{2}\right)$$

In this expression the following two terms are variable in dependence on the energization of the associated electrical circuit:

(1) $\qquad e^I \cos \alpha$ (2) $\qquad \dfrac{I^2 R_c}{2}$

As previously explained, for the system of Fig. 1 the term $e^I \cos \alpha$ does not represent correctly the real power in the associated electrical circuit. However, the addition thereto of the term $$\frac{I^2 R_c}{2}$$

results in a quantity which represents more closely the desired real power.

In most systems of power distribution, the line voltage E of the circuit represented by the conductors 1, 3 does not vary appreciably, and for a given value of real power the line current $$I = \left(\frac{\text{power}}{E \cos \theta}\right)$$

increases as the power factor ($\cos \theta$) deviates from unity in a lagging direction. Consequently the term $$\frac{I^2 R_c}{2}$$

increases as the power factor becomes more lagging.

It will be recalled that the deviation of the term $e^I \cos \alpha$ from values corresponding to the correct real power increases as the power factor becomes more lagging. Since, for a given real power, the terms therein vary in opposite directions in response to variations in power factor, the expression $$\frac{2R}{2R+R_c}\left(e^I \cos \alpha + \frac{I^2 R_c}{2}\right)$$

by suitable selection of the resistance value of the resistor $R_c$ can be made to vary substantially in accordance with the real power of the electrical circuit represented by the conductors 1, 3 for a substantial power factor range.

Let it be assumed again that the instrument 27 has a full scale value of 10 kw. and that a resistor $R_c$ is selected which provides the same pointer reading for a real power of 5 kw. at 100% power factor and for a real power of 5 kw. at 50% lagging power factor. The pointer then may indicate a value of 4.82 kw. on the scale A at both of these power factors. The scale plate S is calibrated to indicate the correct value of power at this position of the pointer. In Fig. 3, a scale B is shown whereon a value of 5 kw. corresponds to a value of 4.82 kw. on the scale A. As a result of these changes, the scale B indicates with reduced error the values of power at all lagging power factors, as shown in the following table which is based on 10 kva. in the electrical circuit:

| Power Factor | Correct Real Power | Power on Scale B | Error |
|---|---|---|---|
|  | Kw. | Kw. |  |
| 100% | 10 | 10 | 0 kw. = 0% |
| 80% lagging | 8 | 7.86 | 0.14 kw. = 1.8% |
| 50% lagging | 5 | 5 | 0 kw. = 0% |
| 20% lagging | 2 | 2.10 | 0.10 kw. = 5% |

By comparison of these values with the values obtained when the resistor $R_c$ is omitted, it is clear that the resistor $R_c$, in cooperation with the scale B, materially improves the accuracy of the instrument.

Since the resistor $R_c$ unbalances the parallel arms between the terminal 53 and the center tap 25 (Fig. 1), it follows that the pointer 47 indicates a value of power when the winding 15 is deenergized. However, since such operation is not encountered in practice, the fact that the instrument provides a reading when energized by current alone is not objectionable. In addition it should be noted that the provision of the resistor $R_c$ introduces an error at low leading power factors. Since low leading power factors are not commonly encountered in practice, the performance of the instrument generally is not objectionable for this reason.

It is believed that the operation of the instrument is apparent from the foregoing discussion. With the instrument connected as shown in Fig. 1, a current $i_e$ flows in series through the heating resistors of the thermoresponsive units 29 and 31, an instantaneous direction of which is illustrated by arrows in Fig. 1. Since the circuit through which the current $i_e$ flows is substantially pure resistance, the current is in phase with the voltage $e$ supplied across the conductors 49, 51 by the secondary winding 23, as shown in the vector representation of Fig. 2. Because of the inherent operation of the transformer formed by the windings 15 and 23, the voltage $e$ is displaced in phase from the voltage $E$ of the associated electrical circuit by an angle $\phi$. In addition, the current $I$ flowing in the conductor 1 divides into two current components $i_1$ and $i_2$ which flow respectively through the heating resistors of the thermoresponsive units 31 and 29. Instantaneous directions of flow of these current components are illustrated by arrows in Fig. 1. By inspection of Fig. 1, it will be observed that the current $i_e$ adds to the current $i_2$ for the thermoresponsive unit 29 and subtracts from the current component $i_1$ for the thermoresponsive unit 31. For this reason the thermoresponsive unit 29 may be termed an actuating unit and the thermoresponsive unit 31 may be termed a restraining unit. As previously explained, the bimetallic springs 33 and 39 act differentially on the shaft 45. In response to the energization of the thermoresponsive units the pointer 47 takes a position which is intended to indicate the real power in the associated electrical circuit.

The resistor $R_c$ unbalances the parallel arms between the terminal 53 and the center tap 25 to make the ratio $i_1/i_2$ less than unity. This increases the rotation of the pointer 47, particularly at low power factors, to compensate for errors introduced by the performance of the transformer represented by the windings 15 and 23.

If desired, the material of the resistor $R_c$ may be selected to provide temperature compensation for the instrument. For example, assume that the arm of the parallel circuit between the terminal 53 and the tap 25 which contains the resistor $R_c$ has a higher temperature coefficient of resistance than that of the remaining arm. As the temperature of the instrument increases, the resistance of the arm containing the resistor $R_c$ then increases at a rate more rapid than that of the other arm and the ratio of $i_1$ to $i_2$ consequently decreases. An opposite effect may be obtained if the arm containing the resistor $R_c$ has a temperature coefficient of resistance which is less positive than that of the other arm. For example, in a 5-ampere instrument of the type disclosed in the aforesaid Vassar patent, temperature compensation was obtained by forming the resistor $R_c$ from a Manganin wire having a diameter of 0.057 inch and a length of 0.75 inch. If no temperature compensation of this type is desired, the resistance represented by the resistor $R_c$ may be introduced by making the conductor 49 longer than the conductor 51 by an amount sufficient to introduce the desired value of resistance.

In the above discussion it was assumed that the current $i_e$ leads the line voltage $E$ by the angle $\phi$. Under some conditions the current $i_e$ may lag the line voltage. For example, the impedance offered to the current $i_e$ may be substantially inductive. Under these circumstances the unbalance of the parallel circuit should be in an opposite direction. That is, the arm containing the conductor 51 and the heating resistors 35 and 37 should have a higher impedance than that of the other arm of the parallel circuit. Such unbalance may be proportioned to compensate substantially for the errors introduced by the leading phase displacement of the current $i_e$ relative to the line voltage.

Although the invention has been described with reference to certain specific embodiments thereof, numerous modifications are possible. Therefore, the invention is to be defined only by the appended claims.

We claim as our invention:

1. In an electrical measuring instrument for measuring a function of a voltage quantity and a current quantity of an electrical circuit, a pair of electroresponsive units having outputs responsive to electrical current supplied thereto, means connecting said units for energization respectively, in accordance with the sum of said quantities and the difference of said quantities, said units when energized equally by a first one of said quantities having a response to said quantities which does not portray accurately said function, said connecting means being proportioned to provide a ratio of the energizations of said units which are dependent on said first one of said quantities other than unity for the purpose of compensating substantially for said inaccuracy, and means differentially responsive to the outputs of said units.

2. In an electrical measuring instrument for measuring a function of a voltage quantity and a current quantity of an electrical circuit, a pair of electroresponsive units having outputs responsive to electrical current supplied thereto, means connecting said units for energization respectively in accordance with the sum of said quantities and the difference of said quantities, said units when energized equally by a first one of said quantities having a response to said quantities which does not portray accurately said function, said connecting means including means for varying the ratio of the energizations of said units controlled by one of said quantities, for the purpose of compensating substantially for said inaccuracy, and means differentially responsive to the outputs of said units.

3. In an electrical instrument responsive to a variable electrical quantity, a pair of electroresponsive units having outputs responsive to the square of electrical current supplied thereto, means connecting each of said units in a separate arm of a parallel electrical circuit for energization from a common source of electrical energy, the arms of said parallel electrical circuit having different temperature coefficients of impedance proportioned to improve the instrument accuracy over a substantial range of temperature, whereby the ratio of the currents flowing from said source through said arms is a function of the temperature of said parallel electrical circuit, translating means responsive to the difference between the outputs of said units, and means cooperating with said source, when said source is connected to said electrical circuit, for energizing said arms to actuate said translating means in accordance with a variable electrical quantity to be measured.

4. In an electrical measuring instrument responsive to a variable electrical quantity, a pair of electroresponsive units having outputs responsive to the square of electrical current supplied thereto, means connecting each of said units in a separate arm of a parallel electrical circuit for energization from a common source of electrical energy, said instrument having an inaccurate response over a desired range if the impedances of said arms are equal, the arms of said parallel electrical circuit having different impedances for improving the accuracy of the instrument, whereby a current component from said source divides unequally in said arms, translating means responsive to the difference between the outputs of said units, and means cooperating with said source for directing through said arms of the parallel circuit in series a current component, whereby said translating means is responsive to a function of the series and parallel current components.

5. In an electrical measuring instrument for measuring a function of a voltage quantity and a current quantity of an electrical circuit, a pair of thermoresponsive units responsive to electrical current supplied thereto, means connecting each of said thermoresponsive units in a separate arm of a parallel electrical circuit for energization in parallel in accordance with a current quantity, said arms having different impedances for improving the accuracy of the instrument whereby said thermoresponsive units are energized unequally by current supplied to said arms in parallel, transformer means for energizing said thermoresponsive units in series in accordance with a voltage quantity, and translating means responsive to the difference between the outputs of said thermoresponsive units.

6. In an electrical measuring instrument for measuring a function of a voltage quantity and a current quantity of an electrical circuit, a pair of thermoresponsive units responsive to electrical current supplied thereto, means connecting each of said thermoresponsive units in a separate arm of a parallel electrical circuit for energization in parallel in accordance with a first one of said quantities, said arms having different temperature coefficients of impedance, whereby the ratio of currents flowing through said arms in parallel varies as a function of temperature for improving the accuracy of the instrument, means for energizing said thermoresponsive units in series in accordance with a second one of said quantities, and translating means responsive to the difference between the outputs of said thermoresponsive units.

7. In a thermal instrument for measuring a function of the voltage and current of an electrical circuit, a transformer having a primary winding and having a secondary winding provided with a center tap, a pair of thermoresponsive units responsive to electrical current supplied thereto, means connecting said thermoresponsive units in a series circuit across said secondary winding, said series circuit having a terminal intermediate said thermoresponsive units, whereby said terminal and said center tap constitute the terminals of a parallel circuit having two arms, each of which arms contains a separate one of said thermoresponsive units, and means differentially responsive to the outputs of said thermoresponsive units, said arms having different electrical impedances proportioned to compensate for errors otherwise present in the instrument.

8. In a thermal instrument for measuring a function of the voltage and current of an electrical circuit, a transformer having a primary winding and having a secondary winding provided with a center tap, a pair of thermoresponsive units responsive to electrical current supplied thereto, means connecting said thermoresponsive units in a series of circuit across said secondary winding, said series circuit having a terminal intermediate said thermoresponsive units, whereby said terminal and said center tap constitute the terminals of a parallel circuit having two arms, each of which arms contains a separate one of said thermoresponsive units, and means differentially responsive to the outputs of said thermoresponsive units, said arms having different temperature coefficients of impedance for providing temperature compensation for the instrument.

9. In a thermal instrument for measuring a function of the voltage and current in an electrical circuit, a transformer having a primary winding designed for energization in accordance with the voltage of an electrical circuit, said transformer having a secondary winding provided with a center tap, a pair of thermoresponsive units having outputs responsive to electrical current flowing therethrough, means connecting said thermoresponsive units in a series circuit across said secondary winding, said series circuit having a terminal intermediate said thermoresponsive units, whereby said terminal and said center tap constitute the terminals of a parallel circuit having two arms, each of which arms contains a separate one of said thermoresponsive units, and means differentially responsive to the outputs of said thermoresponsive units, whereby when said primary winding is energized in accordance with the voltage and said terminals are energized in accordance with the current of an electrical circuit said last-named means is responsive to a trigonometric function of the product of such voltage and current, said arms having different electrical impedances proportioned to compensate substantially for errors resulting from failure of the output of said secondary winding to correspond ideally to the input to said primary winding.

10. In a thermal instrument for measuring a function of the voltage and current in an electrical circuit, a transformer having a primary winding designed for energization in accordance with the voltage of an electrical circuit, said transformer having a secondary winding provided with a center tap, a pair of thermoresponsive units having outputs responsive to electrical current flowing therethrough, means connecting said thermoresponsive units in a series circuit across said secondary winding, said series circuit having a terminal intermediate said thermoresponsive units, whereby said terminal and said center tap constitute the terminals of a parallel circuit having two arms, each of which arms contains a separate one of said thermoresponsive units, and means differentially responsive to the outputs of said thermoresponsive units, whereby when said primary winding is energized in accordance with the voltage and said terminals are energized in accordance with the current of an electrical circuit said last-named means is responsive to a trigonometric function of the product of such voltage and current, said arms having different temperature coefficients of impedance proportioned to compensate said instrument for temperature errors otherwise present therein.

11. In an electrical measuring instrument responsive to a variable electrical quantity, a pair of electroresponsive units each having an output similarly responsive to the square of electrical current supplied thereto, connection means connecting each of the units in a separate arm of a parallel electrical circuit for energization from a common source of alternating electrical energy, transformer means for applying a second energization to said arms, said connection means and the transformer means cooperating to energize the electroresponsive units respectively in accordance with the sum and difference of said first and second energizations, translating means responsive to the difference between the outputs of the units, said translating means having an erroneous response which does not portray accurately the energizations of the units over a desired range if the arms of said parallel electrical circuit have equal impedances, the arms of the parallel electrical circuit having different impedances proportioned to compensate for the error in said erroneous response.

AMBROSE J. PETZINGER.
RODNEY V. ADAMS.

REFERENCES CITED

The following references are of record in the file of this patent:

UNITED STATES PATENTS

| Number | Name | Date |
|---|---|---|
| 606,033 | Scott | June 21, 1898 |
| 1,156,412 | Lincoln | Oct. 12, 1915 |
| 1,624,178 | Paine | Apr. 12, 1927 |
| 1,677,203 | Paine | July 17, 1928 |
| 2,228,655 | Downing et al. | Jan. 14, 1941 |
| 2,323,732 | Smith | July 6, 1943 |
| 2,323,738 | Vassar | July 6, 1943 |
| 2,333,509 | Barnes | Nov. 2, 1943 |